United States Patent [19]

Boney et al.

[11] 4,250,546
[45] Feb. 10, 1981

[54] FAST INTERRUPT METHOD

[75] Inventors: Joel F. Boney; Fuad H. Musa; Terry F. Ritter, all of Austin, Tex.

[73] Assignee: Motorola, Inc., Schaumburg, Ill.

[21] Appl. No.: 929,482

[22] Filed: Jul. 31, 1978

Related U.S. Application Data

[63] Continuation-in-part of Ser. No. 872,857, Jan. 27, 1978, abandoned.

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

| 3,226,694 | 12/1965 | Wise | 364/200 |
|---|---|---|---|
| 3,366,929 | 1/1968 | Mullery et al. | 364/200 |
| 3,373,408 | 3/1968 | Ling | 364/200 |
| 3,440,619 | 4/1969 | Lehman et al. | 364/200 |
| 3,781,810 | 12/1973 | Downing | 364/200 |
| 3,789,365 | 1/1974 | Jen et al. | 364/200 |
| 3,909,794 | 9/1975 | Soltsien | 364/200 |
| 4,010,448 | 3/1977 | Bennett et al. | 364/200 |
| 4,047,161 | 9/1977 | Davis | 364/200 |

OTHER PUBLICATIONS

"M6800 Microprocessor Application manual", Motorola Inc., 1975, pp. 3-2 to 3-7.

Primary Examiner—Gareth D. Shaw
Assistant Examiner—E. Chan
Attorney, Agent, or Firm—Joe E. Barbee

[57] ABSTRACT

A method of performing a fast interrupt in a digital data processor having the capability of handling more than one interrupt is provided. When a fast interrupt request is received a flag is set and the program counter and condition code registers are stored on a stack. At the end of the interrupt servicing routine the return from interrupt instructions retrieves the condition code register which contains the status of the digital data processor and checks to see whether the flag has been set or not. If the flag is set it indicates that a fast interrupt was serviced and therefore only the program counter is unstacked.

4 Claims, 7 Drawing Figures

FAST INTERRUPT METHOD

This is a continuation-in-part of application Ser. No. 872,857 filed on Jan. 27, 1978 (now abandoned) and assigned to the same assignee as the present application. A related application is Ser. No. 929,636 filed on the same day as the present application and assigned to the same assignee.

This invention relates, in general, to digital processors, and more particularly, to a method of performing a fast interrupt in a digital processor having the capability of responding to more than one interrupt.

The use of microprocessors has proliferated in recent years partly due to the ability of designers of such to produce flexible, easy to use systems which are usable both in traditional data processing environments and as replacements for random logic systems. With the proliferation of devices, it has become desirable to provide more flexible and easy to use microprocessors to aid system designers in incorporating the devices into larger systems. High data rates are also desirable in some applications, and increased throughput, with easy to use devices is a continuing design goal. One way to achieve high data rates is to operate on larger pieces of data in parallel.

Many microprocessors or digital processors have the capability of responding to an interrupt request. An interrupt request indicates to the processor that an external event has occurred and requires immediate servicing. In the past, it has been found desirable to have at least two types of interrupt requests. One being a normal interrupt routine and the other being a non-maskable interrupt routine meaning that although the first interrupt request could be programmably ignored or masked the second type of interrupt could never be masked by a programmer. In many applications it is desirable to provide an interrupt servicing routine which occurs much faster than the previously mentioned two types of interrupts.

Accordingly, it is an object of the present invention to provide a fast interrupt servicing scheme which can respond to an interrupt request in a shorter period of time than when responding to other types of interrupt requests.

BRIEF SUMMARY OF THE INVENTION

In carrying out the above and other objects of the invention in one form, there is provided a method of responding to a fast interrupt in a digital data processor capable of handling more than one type of interrupt request. The method of handling the fast interrupt request comprises receiving the fast interrupt request and in response thereto setting a memory or storage means to a predetermined state. The subset machine state is saved by stacking the program counter and also stacking the condition code register which contains the status of the machine. Once the interrupt has been serviced, a return from interrupt instruction (RTI) causes the condition code register to be unstacked and then the storage means is tested to verify that it has been set to the predetermined state. If the storage means is in the predetermined state then this indicates to the processor that only the program counter has been stacked and accordingly the program counter is then unstacked and the digital data processor continues its normal programming.

By only saving contents from a few of the many control registers that the data processor has, the fast interrupt can be serviced in a shortened response time.

Exemplifications set out herein illustrate the preferred embodiments of the invention in one form thereof, and such exemplifications are not to be construed as limiting in any manner.

DESCRIPTION OF A PREFERRED EMBODIMENT

Figure 1:
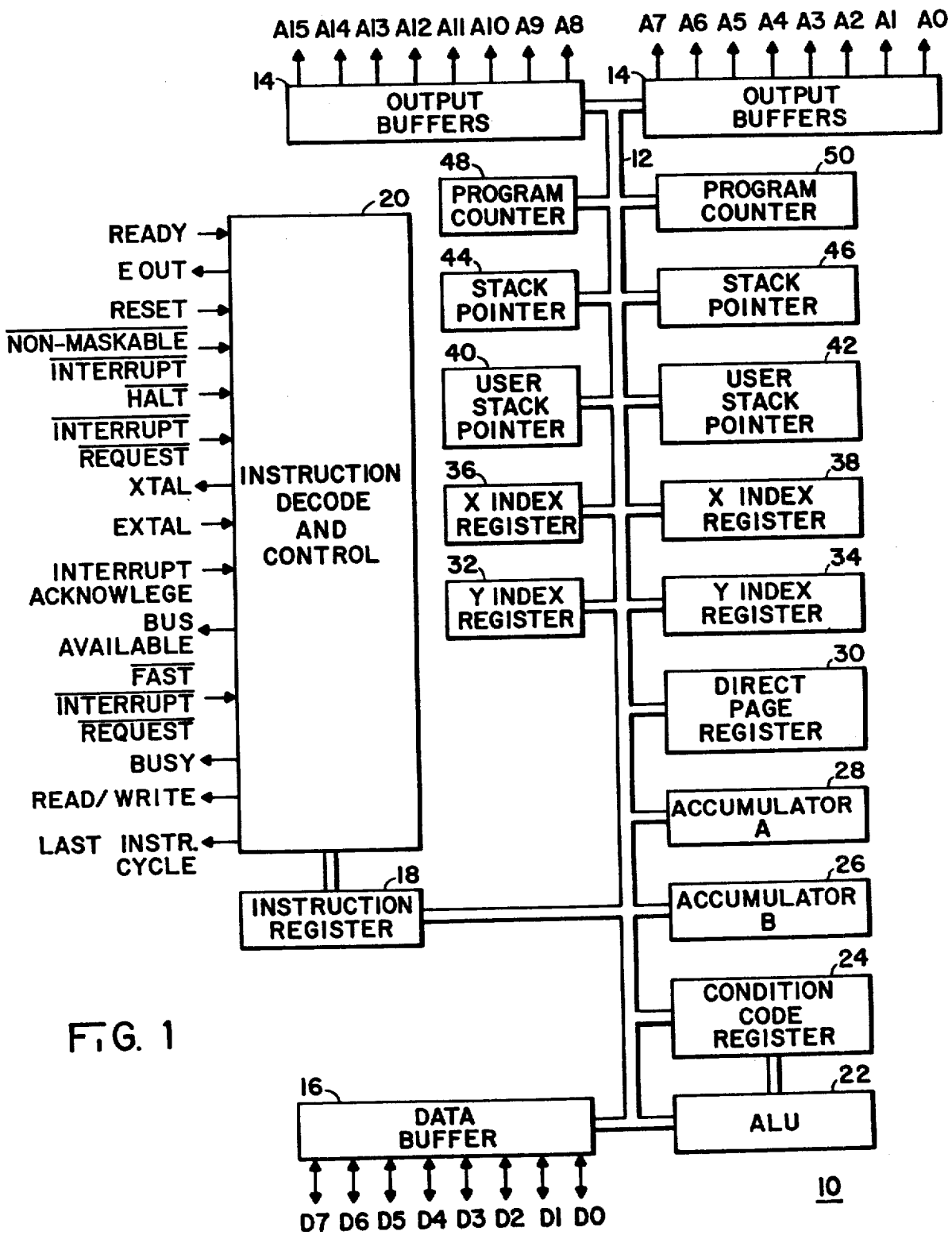
FIG. 1 shows a block diagram of a microprocessor having the capability of carrying out the present invention.

FIG. 1 shows a microprocessor device 10 having a bus 12 for carrying address information or data. Connected to the bus 12 are output buffers 14 which are used to buffer addresses to provide addresses for memory or peripheral devices, not shown, external to the processor itself. Also connected to bus 12 is a data buffer 16 which is 8-bits wide in a preferred embodiment and the function of which is to buffer data from the internal bus 12 to devices external to the microprocessor on the eight lines D0–D7 as shown. The data buffer lines are bidirectional so that data can be transmitted or received through the same data buffering unit 16.

When instructions are received from an external device they are buffered by data buffer 16 and applied to an instruction register 18 and the instructions are decoded by an instruction decoder 20 which also provides and receives control signals. The internal control signals of the device 10 are not shown for clarity of description. Also connected to bus 12 are an arithmetic and logic unit 22 having a condition code register 24 associated therewith. Two accumulators 26 and 28 are provided connected to the bus 12 and arranged such that the two accumulators, which in a preferred embodiment are 8-bits each, may form a 16-bit accumulator which is referred to as accumulator D. The bus also has associated with it a direct page register 30, which is also an 8-bit register. A Y index register has a high 8-bit segment 32 and a low 8-bit segment 34 connected to the bus 12 to form a 16-bit Y index register. Similarly, an X index register has a high 8-bit segment 36 and a low 8-bit segment 38 to form a second 16-bit index register. Two stack pointers are provided each having high and low order segments, the user stack pointer having a high 8-bit segment 40 and a low 8-bit segment 42. A hardware stack pointer has a high 8-bit segment 44 and a low 8-bit segment 46 to provide a 16-bit hardware stack pointer and a program counter has a high 8-bit segment 48 and a low 8-bit segment 50 to provide 16- bits of address which may be applied through output buffers 14 to provide a 16-bit address to devices external to the microprocessor 10.

A plurality of control signals are provided to the instruction decode and control unit 20 including an external memory ready signal, an E (clock) signal which allows the clock of the device 10 to be provided to external system elements for synchronization. A reset pin is provided to initialize device 10 and two interrupt lines provide an interrupt request, and a nonmaskable interrupt to the control unit 20. A halt pin is provided for halting the operation of the machine upon external control. Two terminals are provided for connection to a crystal (XTAL and EXTAL). Interrupt acknowledge and bus available signals are also provided to and from the control device 20 as shown in the Figure. A third interrupt signal $\overline{FIRQ}$ (fast interrupt request) is provided to perform specialized interrupts as will be discussed later. A busy signal is provided from the control device 20 to allow utilization of device 10 in a multiprocessing environment. A read/write signal is provided to direct the reading or writing of data to or from a device external to the device 10. Another signal, last instruction cycle, is provided to indicate to external hardware that the subsequent data on the data bus is a machine operation code. Two other connections to device 10 are not specifically shown but are $V_{DD}$ and $V_{SS}$, the power supply pins, which in a preferred embodiment may be +5 and 0 volts.

It can be seen that the register arrangement of device 10 utilizes a plurality of 16-bit registers as described, and these 16-bit registers allow the performance of operations on 16-bits of data in parallel. The 8-bit registers including the accumulators are used for routine computation and byte-oriented data manipulations, such as editing, interpreting, compiling, and so on, and have the advantage of providing efficient byte-oriented operations which may be more difficult to handle if all registers in the system were 16-bits wide.

As previously noted, the two 8-bit accumulators can be used to form one 16-bit accumulator for double byte operations, thus giving the flexibility of being easily available for either 8-bit or 16-bit operation.

All registers associated with memory-referenced operations (the X and Y index registers, the user and hardware stack pointers) are all 16-bits wide.

Digital processor device 10, because of the register arrangement and other internal features, may perform long relative branches, program-counter relative addressing, and indirection. There is a provision for automatic increment or decrement by one or two to provide easy access to tabular data or to data buffers.

Some of the 16-bit instructions manipulate data in the two accumulators and others manipulate addresses in the index registers or stack pointers.

The "load effective address" instruction allows a programmer to add immediate values of an accumulator to an index register.

A plurality of long branch instructions are described, which are capable of reaching any location in memory. Several high-speed instructions which push or pull a selectable set of registers are provided which facilitate argument passage to and from subroutines, for example, and allow subroutines to save sets of registers at invocation and restore the same set before exit.

The transfer and exchange instructions give processor 10 flexibility and consistency by allowing any register to be transferred or to be exchanged with any like sized register.

The device also includes an unsigned 8-bit by 8-bit multiply with a 16-bit product. The multiply is unsigned to facilitate the generation of multiprecision products. In addition to its use for numerical calculations, the multiply function is useful in calculating array subscripts for programs written in high-level languages.

The auto increment and auto decrement instructions allow data movement and block comparisons in conjunction with memory reference instructions. A SYNC instruction is provided for high-speed synchronization of hardware and software. By stopping the processor and allowing it to start only when an interrupt line is activated or pulled low, the instruction provides a mechanism for synchronizing software with hardware external to processor 10 without the delays associated with interrupts or busy-wait loops.

Among the control signals, the external memory ready input signal is provided for slow memory and multiprocessor management. Additionally, a busy signal is made available during read-modify-write operations for disabling other processors in multiprocessing systems. This busy signal, which allows system hardware exclusion from the start of the read cycle through the associated write interval, assures that updated data will be processed throughout the system.

The maskable fast interrupt pin on processor 10 generates a fast interrupt response for special priority interrupts. This interrupt ($\overline{FIRQ}$) causes the stacking of only the return addresses and condition code. Using only one instruction, a designer may stack all additional registers that must be protected. Moreover, an acknowledgment signal is available during any vector-fetch so that the interrupting device may directly specify the starting address of the associated interrupt handling routine.

Figure 2:
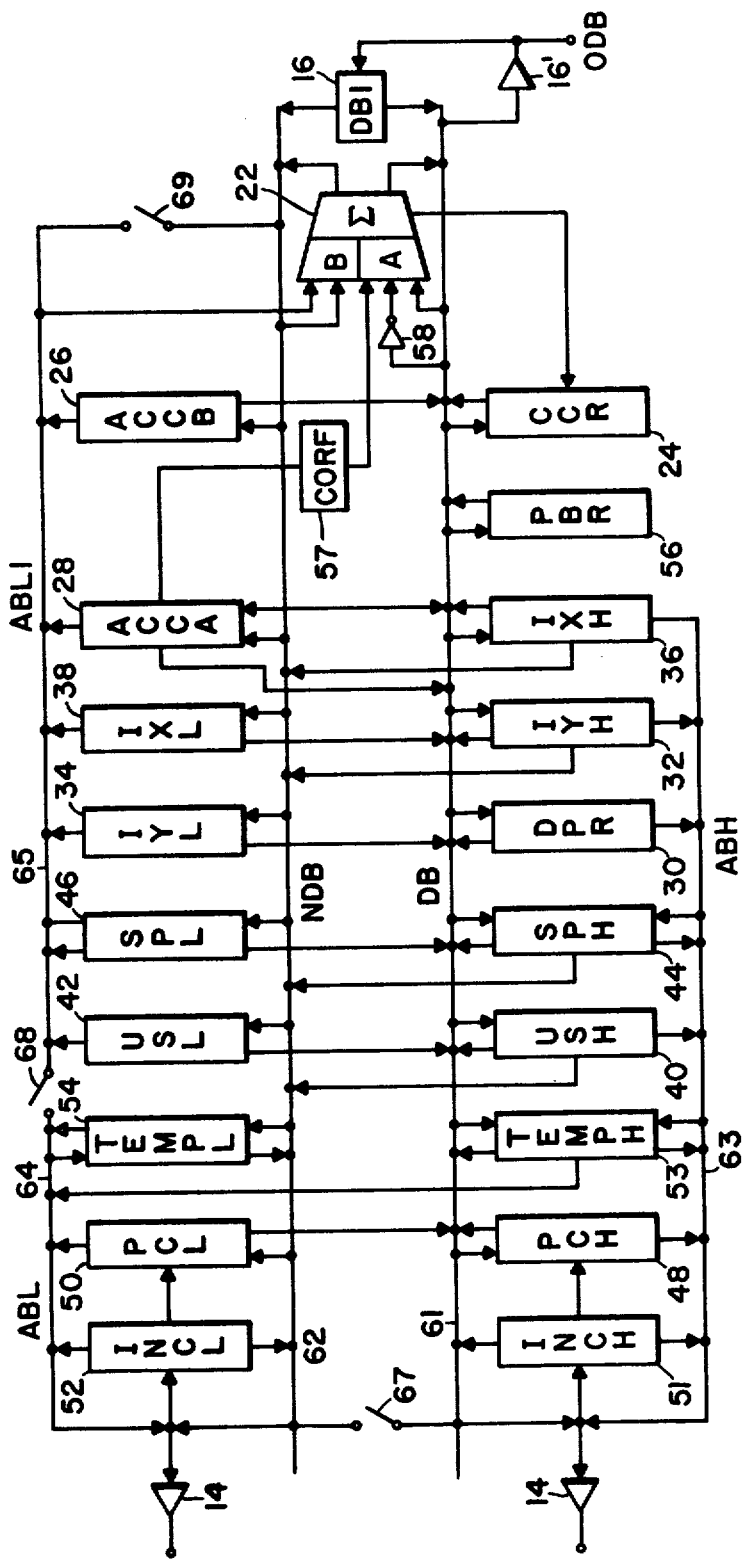
FIG. 2 illustrates in block diagram form a portion of the processor of FIG. 1 and also shows the data path architecture of the processor.

FIG. 2 illustrates a bus structure or data path architecture of processor 10. In addition FIG. 2 includes incrementer registers 51 and 52 and temporary storage registers 53 and 54 which were not shown in FIG. 1 since these registers sometimes tend to be transparent to one who is programming processor 10. This is because temporary registers 53, 54 and incrementer 51, 52 are not directly loadable by software command but are loaded by internal machine microinstruction. Incrementer 52 is coupled between address bus 64 and data bus 62. Incrementer 51 is coupled between data bus 61 and address bus 63. Data buses 61 and 62 are coupled together by bus switch 67 which in an actual embodiment can be a plurality of field effect transistors coupling each of the lines between buses 61 and 62, which field effect transistors are controllable by predetermined signals or commands coupled to their gate electrodes. Address bus 64 is coupled to address bus 65 by switch 68 which can also be implemented the same as switch 67. Address bus 65 is coupled to data bus 62 by switch 69 which once again can be implemented the same as switch 67. Post byte register 56 is coupled to data bus 61 and is used to expand the instruction set capability of processor 10.

As illustrated, arithmetic and logic unit 22 shows that it has two 8-bit inputs, A and B, along with two 8-bit outputs, one going to data bus 62 and one going to data bus 61. Also shown is logic circuitry 57 which couples accumulator 28 to the A input of arithmetic and logic unit 22. Logic circuitry 57 is used to perform an arithmetic correction to data being transferred between accumulator 28 and arithmetic and logic unit 22. A bus inverter 58 is used to invert data from data bus 61 into the A input of arithmetic and logic unit 22. Data buffer 16 has been illustrated as a data bus input register 16 and an output buffer 16'.

Figure 3:
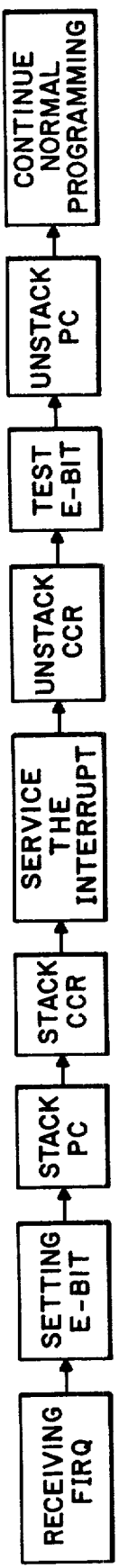
FIG. 3 is a simplified flowchart of a fast interrupt routine.

FIG. 3 illustrates sequential steps in a simplified form which can be followed in performing a fast interrupt routine. As mentioned hereinbefore, processor 10 has the capability of performing a non-maskable interrupt, a fast interrupt, and a regular interrupt, IRQ. The non-maskable interrupt, of course, is the highest priority interrupt and the regular interrupt is the lowest order interrupt. In each of these two cases program registers 48 and 50, user stack pointer 40 and 42, Y registers 32 and 34, X index registers 36 and 38, direct page register 30, accumulators 26 and 28, and condition code register 24 are all stacked prior to servicing either one of these interrupt requests. However, prior to servicing a fast interrupt request only program counters 48 and 50 and condition code register 24 are stacked.

As illustrated in FIG. 3, the first step for the method of performing a fast interrupt request is receiving the fast interrupt request. Next a bit is set, which for purpose of illustration, is indicated to be an E-bit and is not the same as the E (clock) signal which is an input to processor 10 in FIG. 1. In a preferred embodiment the E-bit is a bit location in condition code register 24 but it will be understood that the E-bit could be set in any latch or storage means in processor 10 that will not be disturbed during the servicing of an interrupt. Next in the sequence is stacking the program counter and then the condition code register. The program counter is used in processor 10 by the hardware to point to the next instruction to be executed by the processor. For notational convenience the description of each instruction assumes that the program counter points one location past the last byte of the op code as it would after decoding the instruction. As additional bytes are used by the instruction the program counter always points to the next unused byte. The condition code register defines the state of the processor 10 flags at any given time. The first four bits in the condition code register are set as the result of instructions that manipulate data such as a carry, an overflow, a zero, and a negative. The fifth flag or bit of the condition code register is used to mask a regular interrupt, IRQ. The sixth bit is the half carry bit. The seventh bit is the fast interrupt request (FIRQ) mask bit. The eighth bit (E-bit) can be used as the bit to indicate whether a fast interrupt request has been received.

Once the program counter and the condition code registers are stacked or stored then the interrupt is serviced. A return from interrupt instruction, RTI, is used to get the machine or processor 10 out of the interrupt service routine. The condition code register is unstacked and the E-bit is tested to see whether the machine is returning from a fast interrupt request or from one of the other interrupt request servicing routines. If it is determined that the machine is returning from a fast interrupt routine then only the program counter is unstacked and the machine resumes normal programming.

Figure 4:
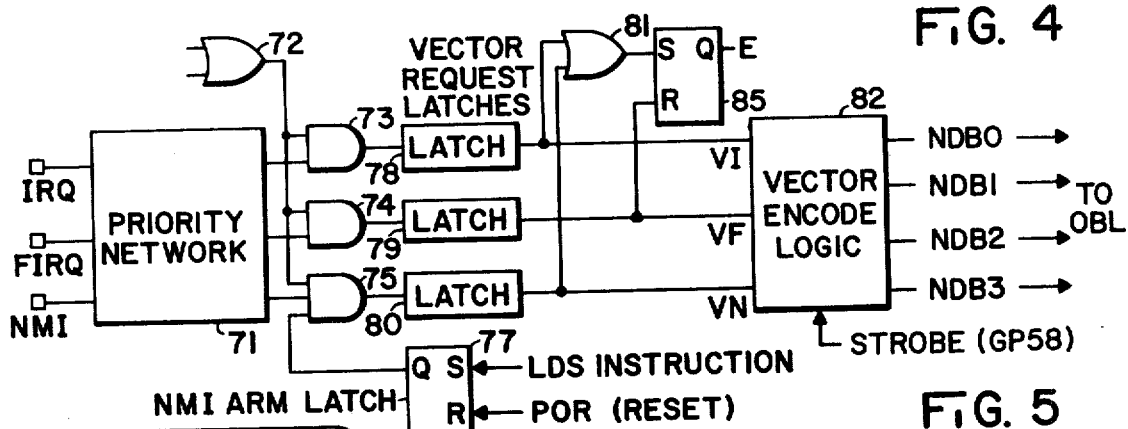
FIG. 4 is a simplified block diagram useful in understanding handling of three different interrupt requests.

FIG. 4 illustrates in simplified block diagram how to implement the handling of the three different interrupt requests for machine or processor 10. Priority network 71 receives the three different interrupt requests (NMI, FIRQ, IRQ) from the interface pins to prioritize the interrupts. Interrupt request, IRQ, is the lowest priority interrupt request, with the non-maskable interrupt, NMI, being the highest priority interrupt. Once the interrupt passes through priority network 71, it is gated by a logic gate 73, 74, or 75 depending upon whether an IRQ, FIRQ, or NMI, respectively, has occurred. Each logic gate 73, 74, 75 receives an input from OR gate 72. OR gate 72 has two inputs; one input indicates that processor 10 is in condition to fetch a new op code while the other input indicates that processor 10 is waiting for an interrupt to occur. Either input will cause an output from OR gate 72 thereby gating logic gates 73, 74, or 75. Logic gate 75 which gates the non-maskable interrupt also receives an input from non-maskable interrupt arm latch 77. The purpose of latch 77 is to inhibit the non-maskable interrupt from reaching latch 80 during the initialization stage of processor 10. Latch 77 is reset by the power on reset, POR, signal and is then not set until a load stack instruction is received which indicates that the initialization of processor 10 is complete and the stack has been loaded. Otherwise, if a non-maskable interrupt was received immediately following power on, but prior to complete initialization of the processor, the results that would follow would be indeterminable. Vector request latches 78, 79, and 80 couple logic gates 73, 74, and 75 respectively to vector encode logic 82. Vector encode logic 82 encodes the least significant four bits of the vector address of each respective interrupt. The four outputs from vector encode logic 82 would appear on output buffer 14 of FIG. 1. An input to vector encode logic 82 is used to strobe the four outputs from logic 82.

The output of vector request latch 79 is also coupled to a reset input, R, of a latch 85. Latch 85 serves as a storage means and as mentioned hereinbefore, in a preferred embodiment, can be a bit location in condition code register 24 (in FIG. 1). The Q output of latch 85 serves as the E-bit signal which indicates the state of latch 85. Latch 85 can be set by an output from an OR gate 81. The inputs for OR gate 81 are from latch 78 which latches an IRQ interrupt and from latch 80 which latches an NMI interrupt. Accordingly, in one embodiment a fast interrupt request (FIRQ) will cause latch 85 to provide a "zero" logic level output as the E-bit while one of the other interrupts will "set" latch 85 and thereby provide a logic level "one". After servicing an interrupt, latch 85 can be tested to verify its state, and if it is in a reset state then the processor will know that a fast interrupt has been serviced and only the condition code register and the program counter were stacked prior to servicing the interrupt and these are the only registers that must be unstacked.

Figure 5:
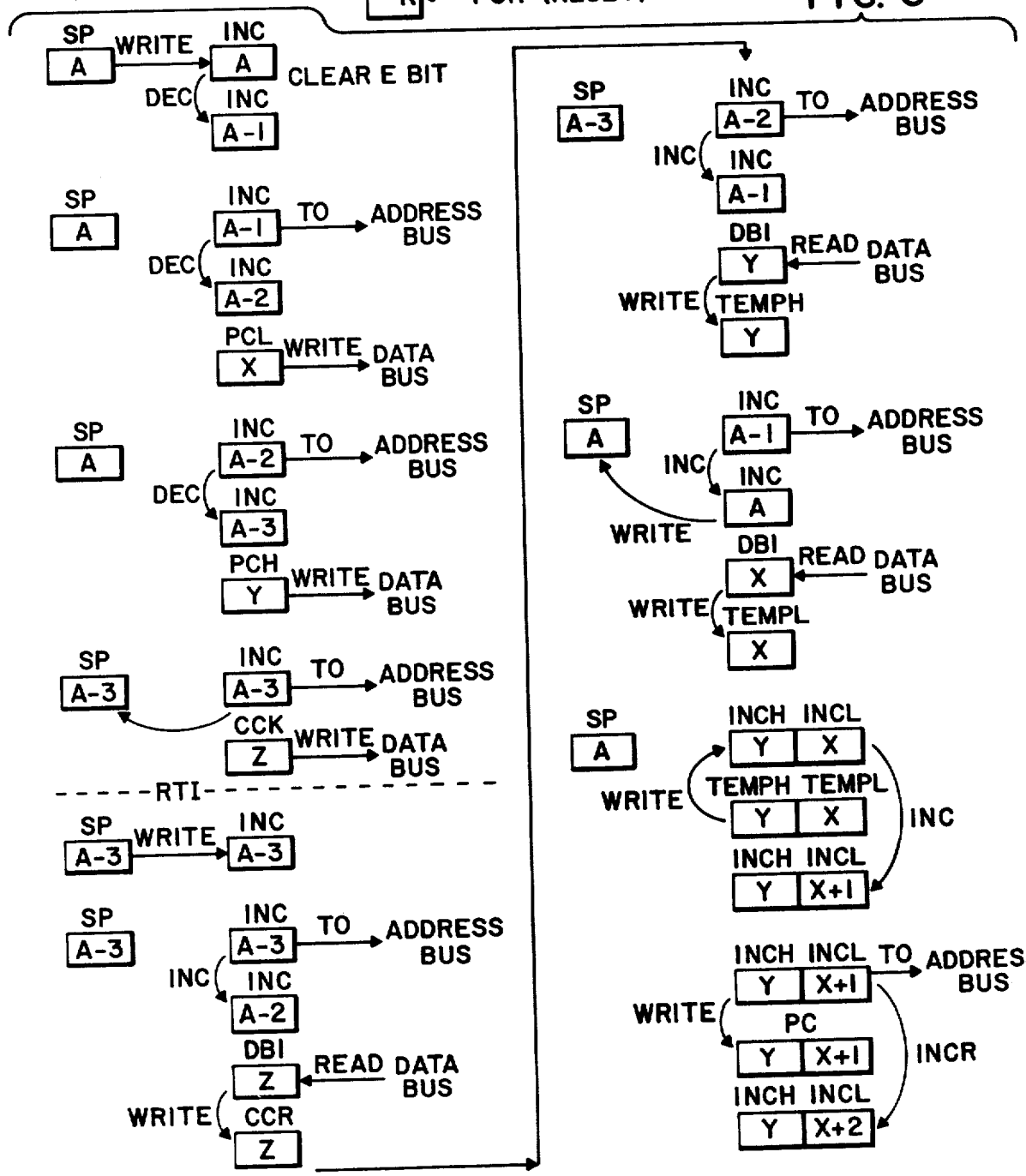
FIG. 5 is a more detailed pictoral illustration of the internal handling of data by certain registers of the processor during a fast interrupt.

FIG. 5 illustrates in detail the transfer of data in some of the registers used in responding to a fast interrupt request (FIRQ). FIG. 5 illustrates one preferred procedure in handling the stacking and unstacking of the program counter and the condition code register. The address location (A) stored in the stack pointer is transferred or written into the incrementer and the incrementer then decrements by a count of one. The address location is decremented instead of being incremented since in a preferred embodiment of processor 10 the address locations are handled in a decrementing manner. At this time the E-bit in the condition code register is cleared indicating that a fast interrupt request has been received. Here once again in a preferred embodiment of processor 10 instead of setting the E-bit it is preferred to clear the E-bit, however, it should be noted that the important step is to set the E-bit to some predetermined state indicating that a fast interrupt request has been received. The contents of the incrementer are then transferred to the address bus and the incrementer is decremented again by a count of one, and the contents of the program counter (PCL) containing the least significant eight bits of data is transferred to the data bus. Now the processor system has the contents of the program counter on the data bus and the address to which it is to be stacked on the address bus. The new contents of the incrementer are then transferred to the address bus and the incrementer is decreased once more and the contents of the most significant program counter (PCH) are transferred to the data bus. The contents of the incrementer are now transferred again to the address bus and also to the stack pointer and the contents (Z) of the condition code register (CCR) are transferred to the data bus. The digital processor is now in a condition to service the fast interrupt request.

Once the interrupt has been serviced a return from interrupt instruction (RTI) causes the address stored in the stack pointer to be transferred into the incrementer. At this point it should be noted that during the servicing of the interrupt the contents of the stack pointer were not disturbed while servicing the interrupt. The contents of the incrementer are then transferred to the address bus and the incrementer is incremented by one. The data (Z) on the external data bus is then read into the data bus input register (DBI) and transferred to the condition code register. By storing the condition code register last it can be retrieved first and the E-bit tested to determine whether a fast interrupt had been responded to or not. As stated hereinbefore, if a fast interrupt is responded to then only two registers are stacked where if a non-maskable interrupt or a regular interrupt, IRQ, is responded to many registers are stacked. The new incremented contents of the incrementer are transferred to the address bus and the incrementer is again incremented by one. The contents (Y) from the external data bus are then received by the data bus input register and temporarily stored in one of the temporary registers (TEMPH). Once again, the incrementer's contents are transferred to the address bus and the incrementer is incremented by one again thereby placing it at a count (A) which was in the stack pointer when the fast interrupt request was received. The contents of the incrementer are then also transferred into the stack pointer and the contents (X) on the external data bus are received by the data bus input register and temporarily stored in one of the temporary registers (TEMPL). This now places eight bits in each one of the temporary registers and each temporary register is then transferred into one of the 8-bit incrementers and the least significant incrementer is incremented by one. Now the contents of the incrementers are transferred back into the program counter and once again the incrementer is incremented by one and processor 10 is in a state to continue its normal programming.

Figure 6:
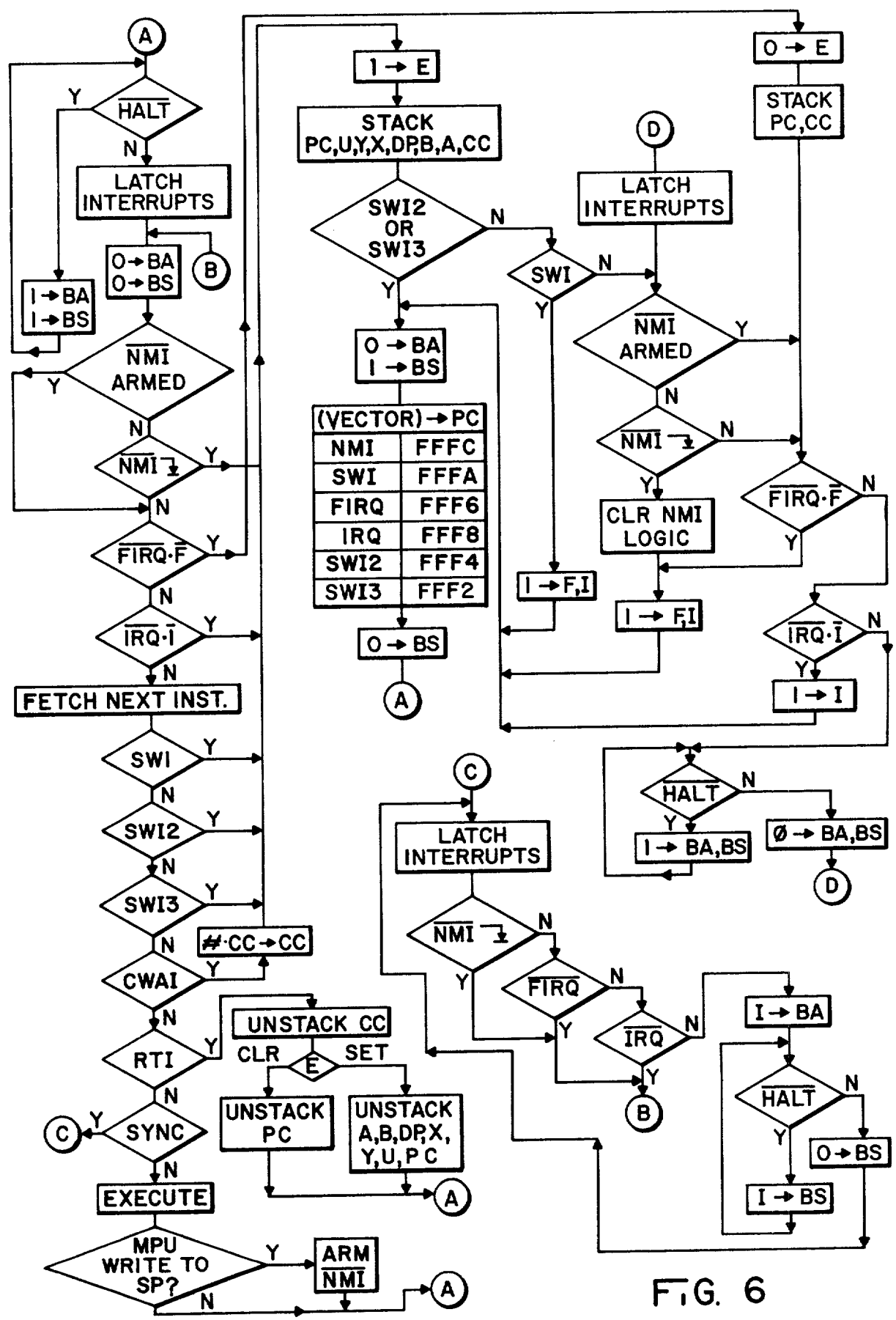
FIG. 6 is a flowchart of the interrupt structure for the processor.

FIG. 6 illustrates in flowchart form the interrupt structure for processor 10. Starting at the top circle, A, processor 10 checks to determine if a halt signal is present. If a halt is present, which is a zero active input signal and therefore illustrated as a $\overline{\text{halt}}$, the bus available (BA) and bus status (BS) signals are both logic level "1's" and the flow diagram loops back up to the A position. If a halt signal is not present then the appropriate vector request latch (FIG. is are set and the bus state signals are both logic level "0's" indicating that the internal processor 10 buses and external buses are both running or not floated. A check is made to verify that the non-maskable interrupt is armed and if the non-maskable interrupt request is absent then a check is made to see if a fast interrupt request is present and is not masked out by a flag bit indicated as F in the condition code register. If a non-maskable interrupt is present then the E-bit is set to a logic "1" and the program counter, user stack,, X and Y index registers, direct page register, the accumulators, and the condition code registers are all stacked. Processor 10 then checks to see whether software interrupts 2 or 3 exist so the bus state can be set to an interrupt acknowledge state (BA=0; BS=1) and the proper interrupt vector code is chosen to service the interrupt. BA and BS are two data bits outputted by processor 10 that describe four states that the processor can be in. State 0,0 (BA=0, BS=0) implies normal programming. State 1,1 implies a halted or DMA grant state, and BA=1, BS=0 denotes a syncing state.

Going back to the main column of the flow diagram, if none of the interrupts are present nor masked then the next instruction is fetched and once again software interrupts (SWI, SWI2, SWI3) are checked for. If none of these are present then a clear and wait signal (CWAI) is checked for. If a return from interrupt instruction (RTI) is activated then the condition code register is unstacked and the E-bit is checked. If the E-bit is clear then only the program counter is unstacked, otherwise, if the E-bit is set the accumulators, direct page, X and Y index registers, the user stack, and the program counter are all unstacked. If a return from interrupt instruction (RTI) is not required then processor 10 checks for a sync instruction; if a sync instruction is present processor 10 enters a syncing state and stops processing instructions to wait on an interrupt. When an interrupt occurs the syncing state is cleared and processing continues.

As can be seen from the flow diagram if a fast interrupt request is present and is not masked out, then the E-bit is cleared to a logic level "0" and the program counter and condition code registers are stacked. F and I bits in the condition code register are also set. The F bit serves to mask out a second fast interrupt reguest and the I bit serves to mask out an interrupt request (IRQ). Once the interrupt mask bits (F, I) are set the proper vector interrupt is chosen and the fast interrupt (FIRQ) is serviced.

Figure 7:
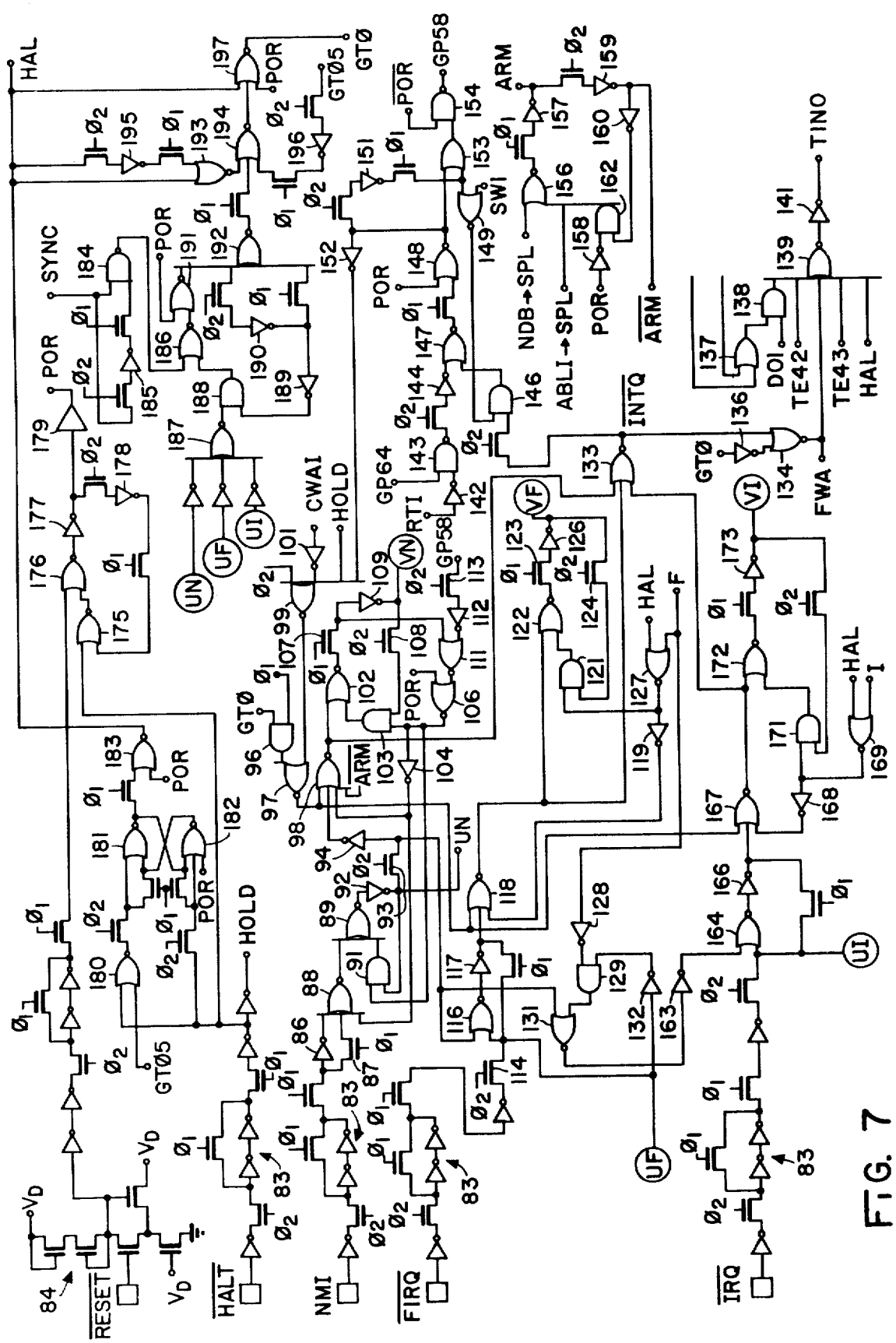
FIG. 7 is a logic diagram illustrating in more detail the circuitry of FIG. 4.

In FIG. 7, five of the interface pins for processor 10 are shown. These five interface pins receive input signals reset, halt, non-maskable interrupt, fast interrupt request, and interrupt request and all are zero active or in other words the complements of the signal are received. The reset input comes into a series of field effect transistors 84 which serves to reduce the effects of transients that may accompany the signal. The reset signal is coupled from field effect transistors 84 by two inverters and a gated field effect transistor into a synchronizing latch. The output of the synchronizing latch is coupled to a capture circuit formed by NOR gates 175, 176 and inverters 177, 178. The output of the capture circuit is buffered by a non-inverting amplifier 179 and is then called power on reset (POR). POR is used throughout processor 10 to perform reset function.

Halt, non-maskable interrupt, fast interrupt, and interrupt request all are passed through synchronization circuits 83 before being used by processor 10. Synchronization circuits 83 include two series inverters having the output connected back to the input by a field effect transistor which is gated or enabled by phase 1 ($\phi$1) of the clock signal for processor 10. Other field effect transistors couple the input and the output of the latches and are enabled by both phase 1 ($\phi 1$) and phase 2 ($\phi 2$) of the clock cycle for processor 10. An output from the halt synchronization circuit 83 is coupled to NOR gate 175 so that the capture circuit can capture a reset signal during halt. If a reset should occur during the presence of a halt signal the capture circuit serves to capture the reset signal so that the reset can be performed upon removal of the halt signal. The output of the halt synchronization circuit 83 is also coupled to an input of NOR gate 180. Also coupled to an input of NOR gate 180 is a signal indicating that the last cycle of an instruction has been performed. The output of NOR gate 180 is coupled by a field effect transistor which is enabled by phase 2 of the clock cycle into one of the inputs of NOR gate 181. NOR gate 181 is interconnected with NOR gate 182 to form a flip-flop latch. One of the inputs for NOR gate 182 is power on reset. The output of NOR gate 181 is coupled to another of the inputs of NOR gate 182 and also coupled to an input of NOR gate 183. A second input of NOR gate 183 is power on reset. The output of NOR gate 183 is coupled to a first input of NOR gate 193 and to a second input of NOR gate 193 by inverter 195 and two transistors enabled by $\phi 1$ and $\phi 2$. The output of NOR gate 193 is connected to an input of NOR gate 194. The output of NOR gate 194 serves as an input for NOR gate 197. In addition, NOR gate 197 has as an input power on reset and also the output of NOR gate 183. The output of NOR gate 197 serves as a signal (GT$\phi$) to indicate the beginning of an op code fetch cycle. An input for NOR gate 194 is the signal (GT$\phi$5) indicating the last cycle of instruction and is coupled by inverter 196 and two transistors. A third input to NOR gate 194 is coupled by a transistor from NOR gate 192. One input of NOR gate 192 comes directly from NOR gate 191 while the other input is coupled from gate 191 through two field effect transistors and inverter 190. Power on reset is one input for NOR gate 191 while the other input comes from NOR gate 186. NOR gate 186 receives an input from AND gate 184. AND gate 184 receives a SYNC instruction input on one input and the other input receives an inverted sync input which is coupled through inverter 185 and two field effect transistors. A second input for NOR gate 186 comes from AND gate 188. One input of AND gate 188 is coupled from the output of NOR gate 191 by one field effect transistor and two inverters 189, 190. A second input for AND gate 188 comes from NOR gate 187 has three inputs UN, UF, and UI which are coupled by inverters and indicate that an interrupt has been received. AND gate 188, NOR gates 186, 191, and inverters 189, 190 form a sync latch circuit. Inputs UN, UF, and UI serve to remove a SYNC instruction input by clearing the sync latch.

The non-maskable interrupt signal is coupled by synchronization circuit 83 into an inverter 86 whose output is connected to an input of NOR gate 88. A second input of NOR gate 88 is the output from synchronization circuit 83 coupled by field effect transistor 87. The purpose of inverter 86 and NOR gate 88 is to form an edge detector circuit to generate a pulse from the non-maskable interrupt signal (NMI). The output of NOR gate 88 is coupled to an input of NOR gate 89. The output of NOR gate 89 is coupled by inverter 92 to an input of AND gate 91. The output of AND gate 91 serves as a second input for NOR gate 89. The output of inverter 92 is also coupled by field effect transistor 93 to an input of NOR gates 116, 131, to inverter 94, and to an input to NOR gate 187. The output of inverter 94 goes to an input of NOR gate 98. Another input for NOR gate 98 comes from NOR gate 97. One input for NOR gate 97 comes from AND gate 96 which has two inputs, phase 1 clock input and the output from NOR gate 197. A second input for NOR gate 97 comes from NOR gate 99. NOR gate 99 has as an input phase 2 clock signal, clear wait signal (CWAI) coupled by inverter 101, an inverted halt signal, and the output from inverter 152. NOR gates 97, 99 along with AND gate 96 and inverter 101 serve the function of OR gate 72 (FIG. 4).

Now another input to NOR gate 98 is from inverter 104. NOR gate 98 also receives an input from inverter 159 which serves to inhibit NOR gate 98 following reset and prior to the stack being loaded. The output of NOR gate 98 goes to NOR gate 133 and to NOR gate 102. NOR gate 102 also receives an input from AND gate 103. The output from NOR gate 102 is coupled by field effect transistor 107, inverter 109, and field effect transistor 108 to the input of AND gate 103. A second input for AND gate 103 comes from NOR gate 106. The output, VN, from inverter 109 serves as the vector request latch output shown in FIG. 4 as the output of latch 80. An input signal indicating that processor 10 is processing the interrupt is coupled into inverter 112 by field effect transistor 113. The input to inverter 112 serves to reset the NMI latch formed by NOR gate 102, AND gate 103, and inverter 109. This input signal clears the NMI request latch to prepare it for receiving the next NMI interrupt. The output of inverter 112 goes to an input of NOR gate 111. A second input for NOR gate 111 comes from the output of NOR gate 102 which is coupled by field effect transistor 107. The output of NOR gate 111 goes to an input of NOR gate 106 and power on reset, POR, serves as a second input for NOR gate 106.

A fast interrupt request (FIRQ) is coupled by synchronization circuit 83 and field effect transistor 114 into an input of NOR gate 116, an input to AND gate 129, and to an input of NOR gate 187. The input that goes to NOR gate 187 is coupled by an inverter and serves to clear the sync latch when a fast interrupt request is received. The output of NOR gate 116 is coupled by inverter 117 and by a field effect transistor which is gated on by phase 1 of the clock signal back into the input of NOR gate 116. The output of inverter 117 also goes to an input of inverter 118. NOR gate 118 also receives an input from NOR gate 97 and from inverter 119. It should be noted that NOR gates 97 and 99, AND gate 96, and inverter 101 perform the function illustrated by OR gate 72 of FIG. 4. The output of NOR gate 118 goes to an input of NOR gate 122 and a second input for gate 122 comes from AND gate 121. The output of gate 122 is coupled by field effect transistor 123, inverter 126, and field effect transistor 124 to an input of AND gate 121. Field effect transistor 123 is enabled by phase 1 of the clock cycle while field effect transistor 124 is enabled by phase 2 of the clock cycle. AND gate 121, NOR gate 122, transistors 123, 124, and inverter 126 serve as vector request latch 75 (FIG. 4) and provide output VF. The mask bit, F, for the fast interrupt request from condition code register 24 (FIG. 1) serves as an input to NOR gate 127 and to inverter 128. A second input for NOR gate 127 is the halt signal. The output of NOR gate 127 goes to an input of AND gate 121 and to inverter 119. The output of inverter 119 serves as an input for NOR gate 118. The output of inverter 128 goes to an input of AND gate 129 and a second input to AND gate 129 is coupled by inverter 132 and field effect transistor 114 from synchronization circuit 83. A second input for NOR gate 131 comes from the priority circuit for the non-maskable interrupt request. The output of NOR gate 131 is coupled by inverter 163 to an input of NOR gate 164 and serves to inhibit an interrupt request (IRQ) when a non-maskable interrupt (NMI) or a fast interrupt request (FIRQ) is present.

An interrupt request input is coupled by synchronization circuit 83 into an input of NOR gate 164. The output of NOR gate 164 is inverted by inverter 166 and coupled by field effect transistor, enabled by phase 1 of the clock signal, back into the input of NOR gate 164. This input to NOR gate 164 also is coupled to an input of NOR gate 187 to terminate a sync instruction once an interrupt request (IRQ) is received. The output of inverter 166 also goes to NOR gate 167. A second input for NOR gate 167 comes from NOR gate 97 which, as mentioned hereinbefore, is equivalent to the output of OR gate 72 (FIG. 4). The output of NOR gate 167 goes to an input of NOR gate 172. The output of NOR gate 172 is coupled by a field effect transistor, enabled by phase 1 of the clock signal, and by inverter 173 to form output VI. Logic gates 171, 172, the two field effect transistors, and inverter serve the function of vector request latch 75 of FIG. 4. The output of inverter 173 is also coupled by field effect transistor enabled by phase 2 of the clock signal to an input of AND gate 171. The output of AND gate 171 serves as a second input for NOR gate 172. A second input for AND gate 171 comes from NOR gate 169. NOR gate 169 receives the halt input and also receives an input, I, from condition code register 24 indicating whether the interrupt request is masked or not. The output of NOR gate 169 also goes to an input of inverter 168 whose output serves as an input for NOR gate 167. NOR gates 98, 118, and 167 provide inputs to NOR gate 133. The output of NOR gate 133 indicates whether an interrupt has been received by processor 10.

An output of NOR gate 133 is used as an input for NOR gate 134. An output from NOR gate 197 is also coupled by inverter 136 as an input for NOR gate 134. The output of NOR gate 134 serves as a control signal to generate an internal op code called force-a-wait (FWA).

The output of NOR gate 133 is also coupled by a field effect transistor to an input of AND gate 146. The output of AND gate 146 serves as an input for NOR gate 147. NOR gate 147 also receives an input from NAND gate 143 which is coupled by a field effect transistor and inverter 144. NAND gate 143 has an input, GP64, coupled by inverter 142 which indicates a return from interrupt instruction (RTI). The output of NOR gate 147 is coupled by a field effect transistor to an input of NOR gate 148. A second input for gate 148 is power on reset (POR). The output of NOR gate 148 goes to inverter 152, a first input of OR gate 153, and is coupled by a field effect transistor enabled by phase 2 of the clock signal and inverter 151 and by a second field effect transistor enabled by phase 1 of the clock signal to a second input of OR gate 153. The output of OR gate 153 serves as an input for NAND gate 154. The second input of OR gate 153 also serves as an input for NOR gate 149. NOR gate 149 has a second input which is software interrupt (SWI). A second interrupt for NAND gate 154 is POR. The output of NAND gate 154 indicates a particular cycle time of an instruction and is coupled to inverter 112 by field effect transistor 113. The output of NOR gate 149 goes to an input of AND gate 146. Logic gates 146, 147, 148, 149 along with inverter 151 and three field effect transistors form a latch for latching processor 10 timing in a waiting-for-interrupt state in response to a clear-and-wait instruction (CWAI). Processor 10 then continues on from this state upon receiving an interrupt.

NOR gate 156, inverters 157, 159, 160, 158, and AND gate 162 form non-maskable interrupt arm latch which is illustrated as element 77 in FIG. 4. NOR gate 156 receives two inputs indicating that the stack has been loaded and inverter 158 couples POR to an input of AND gate 162.

By now it should be appreciated that there has been provided a digital processor capable of handling a plurality of interrupts. A method has been provided which allows one of the interrupts to be handled in a shorter period of time than the other interrupts. What is claimed is:

1. A method of providing a fast interrupt for a microprocessor capable of responding to more than one type of interrupt request and having a plurality of registers including a program counter register and a condition code register so that an interrupt can be serviced in a shortened response time by only stacking contents of two of the plurality of registers while other types of interrupt requests require Stacking Contents of more than two of the plurality of registers, the microprocessor being capable of servicing a plurality of interrupts with at least one of the interrupts being maskable by setting an interrupt mask bit in the condition code register, comprising the steps of:

receiving a fast interrupt request;
   setting a flag bit location in the condition code register to a first state to indicate fast interrupt reguest;
   placing contents of the program counter and condition code registers onto a storage means;
   setting at least the interrupt mask bit in the condition code register to prevent the at least one interrupt from being recognized during the fast interrupt;
   performing an interrupt routine;
   returning the contents to the condition code register from the storage means;
   verifying that the flag bit location in the condition code register is in the first state; and
   returning the contents to the program counter from the storage means.

2. A method of performing a fast interrupt for a data processor having at least a stack, an incrementer, a condition code register, a stack pointer register, and a program counter, the data processor being capable of serving a plurality of interrupts with the fast interrupt resulting in a shortened response time since only contents of two registers are stacked when servicing the fast interrupt while other types of interrupt requests require stacking contents of more than two registers comprising:

receiving a fast interrupt request;
   setting a predetermined bit location in the condition code register to a first state;
   transferring contents of the stack pointer register to the incrementer and updating the contents of the incrementer;
   transferring the contents of the incrementer to the stack pointer register;
   transferring contents of the program counter to the stack;

updating the contents of the incrementer;
transferring the contents of the incrementer to the stack pointer register;
transferring contents of the condition code register onto the stack;
performing an interrupt routine;
recovering the contents of the condition code register from the stack;
verifying the predetermined bit location in the condition code register is in the first state;
updating the contents of the incrementer; transferring the contents of the incrementer to the stack pointer register; and
recovering the contents of the program counter register from the stack so that the data processor can continue from where it was prior to receiving the fast interrupt request.

3. A method for performing a fast interrupt for a data processor having at least a latch, storage means, a condition code register, a program counter register, and an incrementer, the data processor being capable of servicing a plurality of interrupts wherein the fast interrupt allows servicing an interrupt in a shortened response time since contents of only two registers are stacked while other types of interrupt requests require Stacking Contents of more than two registers, comprising the following steps;
receiving a fast interrupt request;
setting the latch to indicate that a fast interrupt is to be performed;
placing contents from the program counter into the storage means;
placing contents from the condition code register into the storage means;
performing an interrupt routine in response to the fast interrupt request;
placing condition code register contents from the storage means back into the condition code register;
testing the latch to verify that a fast interrupt has been performed;
placing program counter contents from the storage means into the program counter; and
continuing with normal program operation of the data processor.

4. The method of claim 3 further including decrementing the incrementer following placing contents from the program counter into the storage means and also following placing contents from the condition code register into the storage means.

* * * * *